(12) United States Patent
Miseiko

(10) Patent No.: US 11,863,577 B1
(45) Date of Patent: Jan. 2, 2024

(54) DATA COLLECTION AND ANALYTICS PIPELINE FOR CYBERSECURITY

(71) Applicant: Rapid7, Inc., Boston, MA (US)

(72) Inventor: Paul-Andrew Joseph Miseiko, Mississauga (CA)

(73) Assignee: Rapid7, Inc., Boston, MA (US)

( * ) Notice: Subject to any disclaimer, the term of this patent is extended or adjusted under 35 U.S.C. 154(b) by 839 days.

(21) Appl. No.: 16/798,580

(22) Filed: Feb. 24, 2020

Related U.S. Application Data

(63) Continuation-in-part of application No. 16/548,068, filed on Aug. 22, 2019.

(51) Int. Cl.
*H04L 9/40* (2022.01)
*G06F 9/455* (2018.01)
*G06F 16/245* (2019.01)

(52) U.S. Cl.
CPC ...... *H04L 63/1433* (2013.01); *G06F 9/45558* (2013.01); *G06F 16/245* (2019.01); *H04L 63/145* (2013.01); *G06F 2009/45562* (2013.01)

(58) Field of Classification Search
CPC . H04L 63/1433; H04L 63/145; G06F 16/245; G06F 2009/45562
See application file for complete search history.

(56) References Cited

U.S. PATENT DOCUMENTS 10,552,246 B1 * 2/2020 Kirmer ................ G06F 11/079
10,673,880 B1 * 6/2020 Pratt ................... H04L 63/1433
11,062,255 B2 * 7/2021 Moakley ............... H04W 4/029
11,178,168 B1 * 11/2021 Lin ..................... H04L 63/1433
2014/0201732 A1 * 7/2014 Haag ...................... G06F 21/10
718/1
2015/0373043 A1 * 12/2015 Wang .................. G06F 21/6254
706/12
2017/0228658 A1 * 8/2017 Lim ...................... G06F 21/56
2019/0260794 A1 * 8/2019 Woodford ............. G06N 20/10
2019/0319971 A1 * 10/2019 Levy ................... H04L 63/1441
2020/0244693 A1 * 7/2020 Ghorbani ............ H04L 63/1433
2021/0076212 A1 * 3/2021 Manikantan Shila .......................
H04W 12/065
2022/0019674 A1 * 1/2022 Frey ..................... G06N 3/0454

* cited by examiner

Primary Examiner — Hee K Song

(74) Attorney, Agent, or Firm — Ashwin Anand; Lei Sun

(57) ABSTRACT

Disclosed herein are methods, systems, and processes for generating, configuring, and implementing a data collection and analytics (DCA) pipeline to optimize the identification of anomalous or vulnerable computing assets and/or anomalous or vulnerable computing asset behavior in cybersecurity computing environments. Raw data from an agent executing on a computing asset is received. A baseline profile or a gold image associated with the computing asset is also received. A difference or delta between the raw data and the baseline profile or the gold image is identified, and an output providing context relating to the difference is generated. The difference relates to a keyed property that is common between the raw data and the base profile or the gold image, and the difference is further filtered to reduce noise in the output.

20 Claims, 5 Drawing Sheets

DATA COLLECTION AND ANALYTICS PIPELINE FOR CYBERSECURITY

CROSS-REFERENCE TO RELATED APPLICATIONS

The present application claims the benefit (and is a Continuation-In-Part (CIP)) of U.S. Utility patent application Ser. No. 16/548,068 filed on Aug. 22, 2019 and titled "Identifying Assets for Review," the disclosure of which is incorporated by reference as if set forth in its entirety herein.

TECHNICAL FIELD

Embodiments described herein relate to methods and systems for monitoring networks and, more particularly but not exclusively, to methods and systems for implementing a data collection and analytics pipeline in cybersecurity computing environments.

BACKGROUND

Due to their prevalence in today's society, the internet and other types of networks have become a hub for criminal activity. Often times cyber-criminals or other threat actors attempt to install or otherwise deploy harmful applications on unprotected systems. Once a threat actor obtains access to a targeted system or device, they may perform further actions such as stealing data, escalating their privileges, or the like. Recognizing and prioritizing assets that are at risk is becoming increasingly difficult as the amount of vulnerabilities, malware, and exploits continue to rise. For example, every year the number of CVEs (common vulnerabilities and exposures) increases, as does the number of general software products.

Existing vulnerability detection techniques do not scale well with the ever-increasing amount of threats. Additionally, these existing techniques are inherently reactive in nature, and only recognize that an asset is infected with malware or the subject of malicious activity after the fact. Additionally, existing techniques for monitoring networks and assets thereon often involve communicating questions or requests for certain data to a network to learn about the network's operation. Received answers may map to solutions to any potential issues on a network. For example, a question may inquire whether an asset has a certain patch installed thereon. If the patch is not installed, a solution would be to install the patch.

However, these techniques generally require methodologies or systems in place to request and gather the required data. These techniques are generally not practical for companies with limited security budgets or entities that do not have these methodologies or systems in place. A need exists, therefore, for systems and methods that overcome these disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for identifying vulnerabilities on an asset. The method includes receiving at an interface raw data from an agent executing on an asset, wherein the raw data relates to operation of the asset; receiving a baseline profile related to the asset; identifying, using a processor executing instructions on a computer readable storage medium, at least one difference between the raw data and the baseline profile related to the asset; and outputting, using the processor, a summary providing context relating to at least one identified difference. In some embodiments, the method further includes receiving content data regarding the asset at the interface, wherein the identification of at least one difference is further based on the received content data.

In some embodiments, the method further includes filtering, using the processor, the at least one identified difference to remove at least one expected difference or at least one trivial difference to reduce excess noise in the outputted summary. In some embodiments, the at least one expected difference relates to a keyed property that is common between the raw data and the baseline profile. In some embodiments, the keyed property includes at least one of a user that accessed the asset, an operating system license property, an asset hardware property, an asset network property, and a key value expected to be different at different times.

In some embodiments, the method further includes identifying a keyed property value for the asset, receiving a baseline key property value, and determining a difference between the keyed property value for the asset and the baseline key property value. In some embodiments, the method further includes identifying the asset as a cloned virtual machine upon determining that the difference between the keyed property value for the asset and the baseline key property value exceeds a threshold. In some embodiments, the method further includes identifying a malicious modification to the asset upon determining that the difference between the keyed property value for the asset and the baseline key property value exceeds a threshold.

In some embodiments, identifying the at least one difference between the raw data and the baseline profile includes identifying at least one of a unique registry entry, a unique file entry, and an absence of expected data. In some embodiments, the method further includes querying a malware database to determine whether the at least one identified difference matches known malware, and implementing a threat mitigation procedure upon determining the at least one identified difference.

According to another aspect, embodiments relate to a system for identifying vulnerabilities on an asset. The system includes an interface for at least receiving raw data from an agent executing on an asset, wherein the raw data relates to operation of the asset, and a baseline profile related to the asset; and a processor executing instructions stored on a computer readable storage medium to provide a pattern recognition module to identify at least one difference between the raw data and the baseline profile related to the asset, and a report generation module configured to output a summary providing context relating to at least one identified difference.

In some embodiments, the interface is further configured to receive content data regarding the asset at the interface, wherein the identification of at least one difference is further based on the received content data. In some embodiments, the processor is further configured to filter the at least one identified difference to remove at least one expected difference to reduce excess noise in the outputted summary. In some embodiments, the at least one expected difference relates to a keyed property that is common between the raw data and the baseline profile, but has different values for the asset and the baseline asset. In some embodiments, the keyed property includes at least one of a user that accessed the asset, an operating system license property, an asset hardware property, an asset network property, and a key value expected to be different at different times. In some embodiments, the pattern recognition module is further configured to identify a keyed property value for the asset, receive a baseline key property value, and determine a difference between the keyed property value for the asset and the baseline key property value. In some embodiments, the pattern recognition module is further configured to identify the asset as a cloned virtual machine upon determining the difference between the keyed property value for the asset and the baseline key property value exceeds a threshold. In some embodiments, the pattern recognition module is further configured to identify a malicious modification to the asset upon determining the difference between the keyed property value for the asset and the baseline key property value exceeds a threshold.

In some embodiments, the pattern recognition module identifies the at least one difference between the raw data and the baseline profile by identifying at least one of a unique registry entry and a unique file entry. In some embodiments, the processor is further configured to query a malware database to determine whether the at least one identified difference matches known malware, and implement a threat mitigation procedure upon determining the at least one identified difference. In other embodiments, a threat mitigation procedure is implemented if the at least one identified difference is determined to be malicious upon further analysis (e.g., using a malware database, malware content, an existing knowledge base, existing malware content, and the like). According to yet another aspect, embodiments relate to a method for identifying vulnerabilities on an asset. The method includes receiving at an interface raw data from an agent executing on an asset of a first type, wherein the raw data relates to operation of the asset of the first type; generating, using a processor executing instructions stored on a computer readable storage medium, an organizational statistical model describing a plurality of secondary assets of the first type; executing an analytics engine to identify at least one difference between the raw data from the agent and the organizational statistical model describing the plurality of secondary assets of the first type; and outputting, using the processor, a summary relating to at least one identified difference. In some embodiments, the method further includes querying a malware database to determine whether the at least one identified difference matches known malware, and implementing a threat mitigation procedure upon determining the at last one identified difference matches malware in the malware database (or upon further analysis if there is no match).

In some embodiments, the method further includes identifying a keyed property value associated with the asset, wherein a difference between the identified keyed property value associated with the asset and a keyed property value associated with the plurality of secondary assets exceeds a threshold. In certain embodiments, the method further includes identifying a difference associated with the asset, wherein a difference between the asset and a plurality of secondary assets exceeds a threshold. Examples of differences can include one or more of a keyed property, the value of a keyed property, a registry entry, a file entry, the presence of data, or the absence of data. In some embodiments, the method further includes identifying a malicious modification to the asset upon identifying at least one difference between the asset and the plurality of secondary assets that exceeds a threshold or when compared with a baseline profile (also known as a "gold image").

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Introduction

Figure 1:
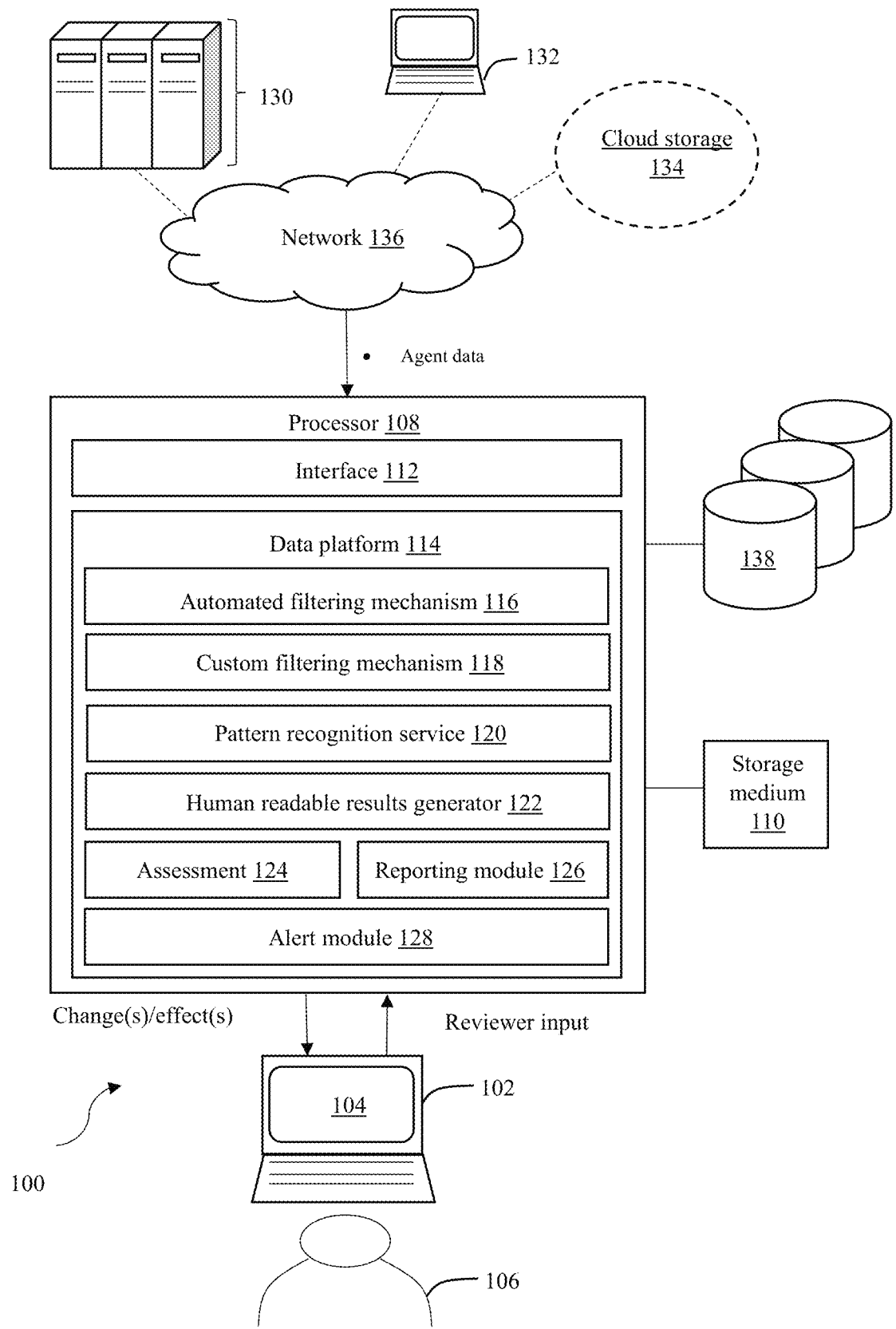
FIG. 1 illustrates a cybersecurity data collection and analytics pipeline (DCA Pipeline), according to one embodiment of the present disclosure.

In certain cybersecurity computing systems and/or environments that deploy agents (e.g., physical or virtual computing devices (e.g., software) that are typically deployed on protected assets (e.g., laptops)), collect a large amount of raw data from such computing assets. In certain configurations, an assessment service can transform the raw data (which can exceed 100+MB of data on a per asset basis) into a summarization based on a set of predetermined questions that map to human readable descriptions and solutions (e.g., content and referred to hereinafter also as "content" or "content data"). The foregoing summarization process typically produces a set of results (e.g., approximately 2 KBs in size) for downstream consumption by a presentation and/or analytics engine (e.g., an on-premises console).

The foregoing simplifies the management of data for downstream customers but at a cost of resolution. Downstream consumers generally only know (or are aware of) what they are told and therefore can become limited by questions that "content" uses to query the "raw data." Instead of querying the raw data with a static set of questions, the methods, systems, and processes described herein compare the raw data across multiple computing assets with similar characteristics (e.g., same operating system version, customer, and the like) and identify differences (or deltas) associated with each computing asset. In one embodiment, the differences represent non-compliant software installations and/or configurations, systems behind in security, software, and/or operating system updates, and systems infected with malicious software (e.g., malware, viruses, and the like).

In some embodiments, the accuracy of the aforementioned Data Collection and Analytics Pipeline (referred to hereinafter as simply "DCA Pipeline") improves (or can be optimized) with the number of computing assets being compared. In this example, a filtering mechanism is implemented to remove expected differences between computing assts such as time components, pseudo random number generation seeds, network interface properties, and ownership information. In other embodiments, the filtering mechanism is self-taught via identification of frequent deltas (differences) across multiple computing assts, but can also be configured to support custom filtering in situations where there are not enough assets or similar properties across assets to compute or generate an adequate filter.

Example Applications (or Use Cases)

In some embodiments, the DCA Pipeline provides an alternate perspective into a customer's computing environment that a customer can customize based on a gold image (e.g., a baseline asset image or representation). Once a gold image or baseline asset is established, either explicitly or implicitly (e.g., through a common denomination methodology), a customer can determine how computing assets in their cybersecurity computing environment compare against the gold image or baseline asset. The foregoing permits a customer to identify multiple scenarios (e.g., policy compliance, patch management, security operations, and the like). Thus, the DCA Pipeline framework can be leveraged in cybersecurity computing environments to enhance data collection efficiency because the DCA Pipeline can identify common and uncommon blocks of data across computing assets that can be used to automate the implementation and maintenance of a data collection hash.

In certain embodiments, the DCA Pipeline permits at least (1) identification of non-compliant software installations and/or configurations when no content exists, (2) identification of systems behind (e.g., not updated) in security, software, and/or operating system updates when no content exists, (3) identification of systems infected with malicious software such as malware and viruses when no content exists, (4) identification of common and uncommon blocks to automate implementation and maintenance of a data collection hash framework, and (5) identification of gaps in current content coverage.

Example Automated Filtering Mechanism (AFM)

In one embodiment, an automated filtering mechanism (AFM) of the DCA Pipeline maintains a list of filters based on the comparison of data across multiple computing assets. The AFM takes into account common keyed properties across multiple sets of computing assts that have different values. Examples of keyed properties with different values across multiple computing assets can include a last logged in user, network information properties, hardware properties, and operating system license properties. AFM removes at least the foregoing common keyed properties with different values (among others) to eliminate excess noise presented to a customer. In certain embodiments, the threshold for automated filters includes different values between various computing systems allowing for edge cases to accommodate cloned virtual machines and similar scenarios.

However, in another embodiment, AFM does not remove common keyed properties with similar values of low deviation (e.g., because doing so can prevent the recognition of malicious modifications to assets).

Example Custom Filtering Mechanism (CFM)

In some embodiments, a customer filtering mechanism (CFM) is implemented to augment the AFM if (and when) the AFM is unsuccessful at determining when a particular keyword property should be filtered. The CFM can be used in conjunction with the AFM by DCA Pipeline, and vice-versa.

Example Pattern Recognition Service

In other embodiments, the DCA Pipeline implements a pattern recognition service that identifies deltas (differences) between assets with the purpose of quantifying the delta into a format that a human being can understand and take action on. For example, the pattern recognition service describes abstract concepts (e.g., otherwise the pattern recognition service is just another assessment service that limits its scope to deltas between a set of assets).

In one embodiment, the identification of a difference or delta associated with registry keys and/or files that are unique to a single asset can be an indication of a policy breach or a malicious software infection. In this example, the identified deltas can provide insight into the customer's computing and/or networking environment that a tradition (or existing) content driven assessment pipeline would fail to report on. The identified deltas can be used to drive the prioritization of future content to provide more context into what the delta means for a given customer (or in a given cybersecurity computing environment).

In some embodiments, the detection of deltas (or differences) across computing assets can be used by DCA Pipeline to provide information about a customer's computing environment without the need for coverage associated with the information being provided.

Example Procedure

First, and in a one embodiment, a data collector is installed on a Windows computing system that executes in a test computing environment. In this example, there will be two sets of three systems that contain the same operating system version, but are not the same operating system version, and one system that contains an operating system version unlike the other operating system versions in the computing environment.

Second, and in another embodiment, an analytics prototype is generated that evaluates collected data from each Windows system and performs automated filtering (with customer filtering capabilities) to determine whether deltas or differences exist for reporting purposes.

Third, and in some embodiments, an assessment pipeline is generated that evaluates collected data for comparison purposes.

Fourth, and in other embodiments, a determination is made whether the DCA Pipeline can observe the same information observed by the assessment pipeline.

Example of Analyzing Differences or Deltas

It will be appreciated that the DCA Pipeline disclosed herein outperforms an assessment pipeline from an accuracy perspective. The DCA Pipeline can identify "unique registry and file entries" on a given computing asset (in addition to malware). For example, public malware database can be queried by DCA Pipeline to determine if differences are associated with existing and/or known malware. It should be noted that the risk or severity of differences in assets that is unique is not necessarily related to a given piece of malware's existence in a public malware database. In fact, the lack of existence of the given piece of malware in a public malware database can imply a higher risk (e.g., against a customer) because the difference(s) in asset(s) can involve a targeted effort against the customer by a malicious group or state.

In certain embodiments, deep inspection of files discovered to be unique and further analysis (and determination) of what unique registry key names and values represent can potentially further reduce noise and improve assignment of accurate risk to information reported (e.g., by an analytics engine).

Examples of Content-Based and
Non-Content-Based Data Analytics

As discussed previously, existing techniques for learning about a network generally require having methodologies or systems in place to issue requests for certain data. However, entities with, e.g., limited security budgets may not have adequate means or systems in place to gather data regarding a network and activity thereon. The systems and methods described herein simplify how data regarding a network of interest can be leveraged to extract meaningful insights about the network. For example, and as discussed previously, existing techniques generally rely on content to extracting meaningful data regarding a network. However, in accordance with the systems and methods described herein, value can be extracted from data using analytics, or machine learning, and without the requirements of existing content-driven techniques. The embodiments described herein can deploy one or more agents to execute on assets to gather raw data regarding asset operation.

The systems and methods herein can then compare the raw data across multiple assets of the same type (e.g., assets with similar characteristics such as similar operating systems, versions, presence on the same network, and the like) to detect differences associated with each asset. Detected differences can represent non-compliant software installations; non-compliant software configurations; systems that are insecure for lack of security, software, and operating system updates; and systems infected with malicious software such as malware and viruses. As disclosed herein, "malware" can refer to malicious software, viruses, vulnerabilities, policy violations, or the like. The accuracy of the disclosed systems and techniques can increase with the number of assets being compared and/or with the use of a gold or baseline image.

The embodiments described herein can leverage one or more filtering mechanisms to, for example, remove or otherwise dismiss expected differences between assets. These expected differences may relate to, for example, time components, pseudo random number generation seeds, network interface properties, and ownership information. The filtering mechanism(s) can be self-taught via identification of frequent deltas in similar properties across multiple assets. However, custom filtering can also be supported in situations where there are not enough assets or similar properties across assets to compute a proper, meaningful filter.

As discussed above, existing assessment services transform raw data regarding network activity into a summarization based on a set of predetermined questions or checks that map to human readable descriptions of potential issues and solutions to those issues (e.g., how to solve a detected vulnerability or policy violation). The resultant data can indicate, among other things, whether an asset is at risk of one or more vulnerabilities, is behind on updates, or is in violation of one or more policies and may be over several kilobytes in size. This data resulting from the content-driven techniques (for simplicity, "content data" or "content") can then be transferred for downstream consumers by a presentation or an analytics engine. This simplifies data management for the consumers, but at a cost of resolution. In other words, the downstream consumers only know what they are told from the summary, and are therefore limited by the initial questions that were asked to obtain the descriptions of any potential issues.

Example Data Collection and Analytics (DCA)
Pipeline Computing System

FIG. 1 illustrates a system 100 that implements a Cybersecurity Data Collection and Analytics Pipeline (DCA Pipeline) in accordance with one embodiment. The system 100 may include one or more user devices 102 executing a user interface 104 for presentation to a user 106. The user 106 may be a network administrator of a customer or otherwise someone interested in monitoring the security of a company's network. In this case, the user 106 may be interested in gathering data regarding a customer's network or asset's thereon. For example, the user 106 may not have systems in place to, for example, ask the customer questions regarding their network, but instead rely on agents executing on the customer's network.

The processor 108 may execute instructions stored on a computer readable storage medium 110 to provide various modules to accomplish the objectives of the various embodiments described herein. Specifically, the processor 108 may execute or otherwise include an interface 112 and a data platform 114 including an automated filtering mechanism 116, a custom filtering mechanism 118, a pattern recognition service 120, a human readable results generator 122, an assessment module 124, a reporting module 126, and an alert module 128.

The interface 112 may receive activity data from agents operating on one or more clients 130, 132, and 134 over one or more networks 136. The clients 130, 132, and 134 are represented by assets such as servers, devices, storages, workstations, desktops, laptops, mobile devices, or the like, that are associated with clients or customers of a vendor or service provider. For example, clients 130, 132, and 134 may have hired a vendor associated with the processor 108 to perform some type of analysis on their network activity data. The interface 112 may receive data from agents in batches or otherwise at predetermined time intervals. For example, data may be communicated to the interface 112 once every hour. The frequency at which messages are sent over the network(s) 136 to the interface 112 can vary and can be determined or set by the user 106 or personnel associated with clients 130, 132, and 134. Such data collection can occur on a schedule, by request, or can be caused by a situational change (e.g., an event).

Figure 2:
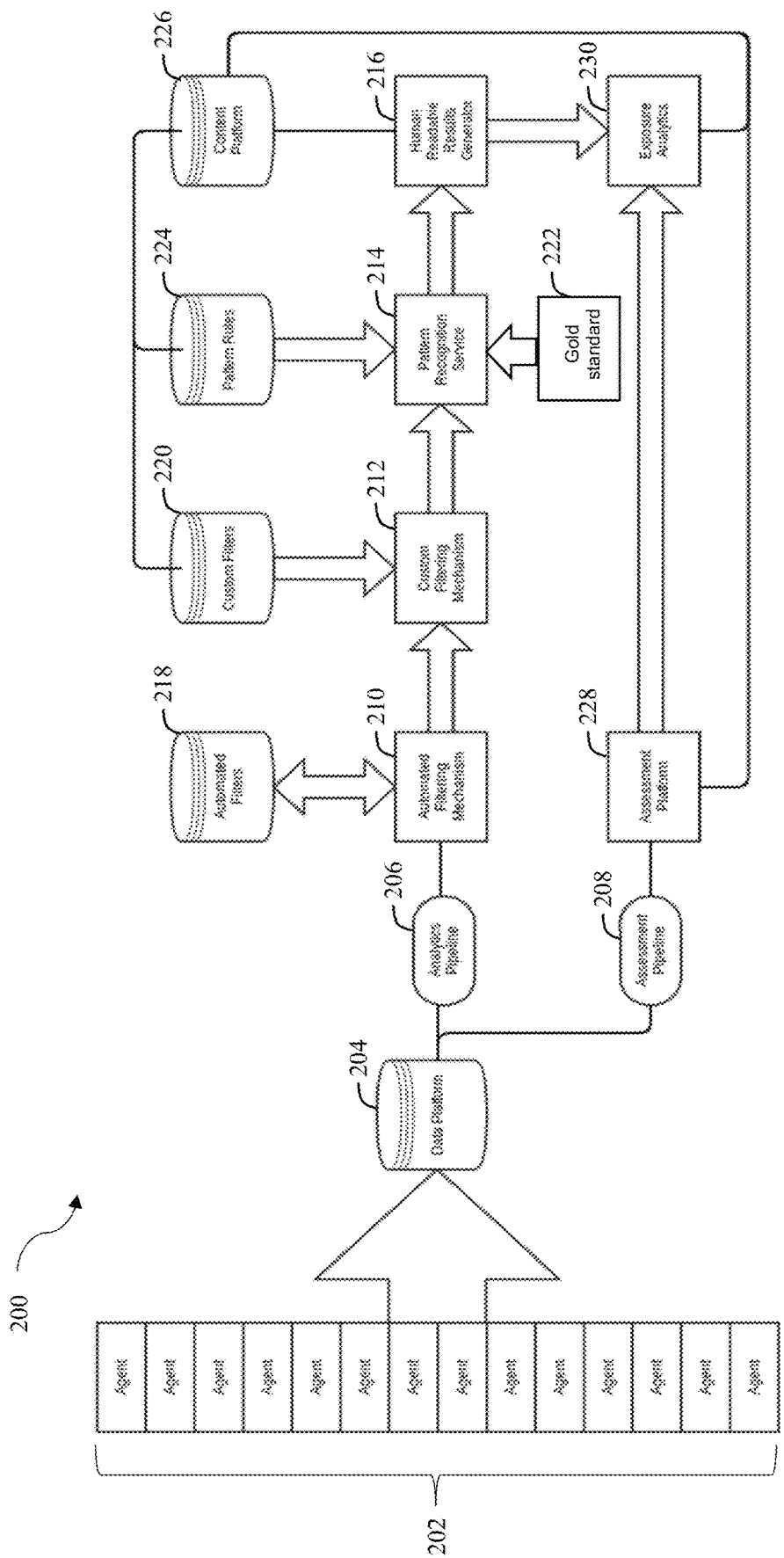
FIG. 2 illustrates an automated filtering mechanism, according to one embodiment of the present disclosure.

FIG. 2 illustrates a diagram 200 of an automated filtering mechanism (AFM) in accordance with one embodiment. As seen in FIG. 2, the workflow of the diagram 200 may be performed using components that are similar to the components of the system 100 of FIG. 1. As discussed previously, an organization may have a plurality of agents 202 executing on a plurality of assets. These assets may be on or otherwise associated with a network of a customer, for example, and may be similar to those discussed in conjunction with clients 130-34 of FIG. 1. In some embodiments, these assets may also be foreign (or third party) networks (e.g., an airport Wi-Fi network, a coffee shop network, and the like).

Accordingly, the agents 202 gather activity data associated with one or more assets. This can include, for example, average connection durations for network devices, the average amount of data exchanged during a given connection, services offered by the devices, ports the devices use to communicate, or the like. This agent-obtained data can typically exceed over one hundred (100) MB of data on a per asset basis. For example, there can be millions of agents executing on assets, and each agent may capture and communicate hundreds of messages. The agent-obtained data may be communicated to the data platform 204, which can be similar to the data platform 114 of FIG. 1. Additionally or alternatively, the agent-obtained data may be communicated to and stored in one or more databases such as the database(s) 138 of FIG. 1.

The method 200 proceeds by executing at least one of an analytics pipeline 206 and an assessment pipeline 208. The analytics pipeline 206 involves executing one or more of an automated filtering mechanism 210 such as the automated filtering mechanism 116 of FIG. 1, a custom filtering mechanism 212 such as the custom filtering mechanism 118 of FIG. 1, a pattern recognition service 214 such as the pattern recognition service 120 of FIG. 1, and a human readable results generator 216 such as the human readable results generator 122 of FIG. 1.

The automated filtering mechanism 210 maintains a list of filters based on a comparison of data across multiple assets. This enables the automated filtering mechanism 210 to take into account common properties such as keyed properties across multiple sets of assets that have different values. Some examples of keyed properties with different values can include the last user to access an asset, network information properties, hardware properties, and operating system license properties. Accordingly, and in certain embodiments, the automated filtering mechanism 210 removes these common keyed properties, even ones with different values, to reduce false positives that are presented to a customer or user such as the user 106 of FIG. 1.

In some embodiments, thresholds can be in place for the automated filters as many systems have different values, thereby allowing for some occasional edge cases to accommodate cloned virtual machines and similar scenarios. For example, a network interface MAC address or a system UUID associated with a virtual machine can change when the instance is cloned.

As another example, malicious modifications can include changes to configuration properties that reduce security or make an asset more vulnerable. These may include, but are not limited to, a simplified or removed password, reduced security on password storage, additional privileges assigned to a user, or the like. Accordingly, the automated filtering mechanism 210 can be configured to determine how these modifications exceed some threshold(s) to determine whether they are (or not) noteworthy.

The automated filtering mechanism 210 can execute one or more automated filters 218. These automated filters 218 can be stored in one or more databases such as the database(s) 138 of FIG. 1. However, the automated filtering mechanism 210 does not remove common keyed properties with similar values of low deviation, since doing so could prevent recognition of malicious modifications to assets. The data platform 204 may receive extremely large amounts of data from the executing agents 202. Accordingly, the automated filtering mechanism 210 may distinguish meaningful data from noise through statistical analysis and remove unimportant data. For example, the operating system Windows® 7 maintains a system registry with key-value pairs that affects various behaviors. The systems and methods described herein can identify registry keys that are changing and have different values. In these instances, the automated filtering mechanism 210 can analyze the agent-provided data and filter the provided data but without excluding atypical keys that may be indicative of malware.

The custom filtering mechanism 212 can augment the automated filtering mechanism 210. For example, the custom filtering mechanism 212 can augment the automated filtering mechanism 210 when the automated filtering mechanism 210 is unsuccessful or is otherwise incorrect when determining a particular property should be filtered. The custom filtering mechanism 212 can execute one or more custom filters 220. These custom filters 220 can be stored in one or more databases such as the database(s) 138 of FIG. 1. The custom filtering mechanism 212 therefore allows or permits an operator to introduce additional filter parameters. These parameters can include those that are, for example, not easily detectable by conventional filtering techniques or otherwise implemented by the automated filtering mechanism 210.

As an example, Windows® 7 implements a pseudo random number seed generator. Every time a system is restarted, data is added to the random number generator. More specifically, a pseudo random number generator stores a seed in a registry, wherein the seed is used to initialize the number generator from a non-initialized state such that it generates different random numbers from any prior initialization. If data was not added, the generator would not know to update its outputted seed numbers, which could result in the same numbers being generated. In any event, the automated filtering mechanism 210 or the custom filtering mechanism 212 can be configured to filter these expected differences amongst generated number seeds or other types of keyed values that are expected to be different at different times.

As another example, assets of a financial department of a company may be expected to behave similarly. Accordingly, these assets can have common sets of keys that, even if the values differ, may not be noteworthy and may be filtered (e.g., by AFM). Similarly, different departments or types of employees may have or may be expected to have different installed software. For example, an organization's financial team or other types of groups may need software that the organization's engineers wouldn't need, and vice versa. Filtering these expected differences can be the result of a combination of the automated filtering mechanism 210 and the custom filtering mechanism 212.

The pattern recognition service 214 can identify differences between assets with the purpose of quantifying the differences into something a human user can understand and act on. The pattern recognition service 214 can therefore describe abstract concepts. That is, the pattern recognition service 214 may provide insight regarding the meaning of identified differences across a network. For example, the pattern recognition service 214 can rely on baseline behavior (discussed below) to inform the user 106 regarding whether identified differences are meaningful. Otherwise, the pattern recognition service 214 would be similar to existing assessment services that are limited in scope to differences between a set of assets.

The identification of differences between registry keys and/or files that are unique to a single asset could be an indication of a policy breach or a malicious software infection. It will be appreciated that identified differences can provide insight into a customer's environment that traditional, content-driven assessment techniques would (likely) fail to report. The identified differences can be used to drive the prioritization of future content to provide more context into what the differences mean for the customer.

As seen in FIG. 2, the pattern recognition service 214 can also consider a gold standard 222 in analyzing the received data. The gold standard 222 essentially acts as a baseline behavior and establishes what groups or systems should look like. In the context of the present application, the term "group" may refer to teams or other types of groups such as those within an organization that are similar to each other in some aspect. Accordingly, this expectation that similar assets (e.g., assets that belong to the same group) behave similarly may help identify instances indicative of malware, vulnerabilities, policy violations, or the like.

For example, the gold standard 222 can act as a priority benchmark or baseline to find anomalous conditions with respect to one or more features. These gold standard(s) 222 (e.g., one or more gold standards) may be chosen or otherwise set by a customer. In some embodiments, a customer can nominate a certain asset, group of assets, systems, or the like to represent the gold standard 222. Accordingly, a customer or other type of user may, but does not need to, manually input characteristics, features, behavior, or other type of data to define the gold standard 222. In some embodiments, a customer may chose, set, or otherwise nominate one or more gold standards 222 on a per group basis such that a customer may have multiple gold standards 222 in their environment (e.g., multiple gold images).

The features describing the gold standard 222 can include any type of data regarding a computing asset. The features extracted can also depend on the type of asset. The features can include any one or more of software executing on the asset, installed on the asset, stored on the asset; versions of software on the asset; source IP address of a connection; destination IP address of a connection; connection history associated with the asset; duration of a connection involving the asset; ports used; timestamps of connections involving the asset; packet counts to or from the asset; bytes transmitted to or from the asset; services utilized by the asset, and the like. This list of features is merely exemplary, and other types of features may be used to determine the gold standard 222 in addition to or in lieu of those mentioned above. That is, the gold standard 222 may be based on any one or more of these types of features as well as others. Once a gold standard 222 or baseline asset is established (either explicitly or implicitly) (e.g., through a common denomination algorithm or other methodology), a customer can learn how assets in their environment compare against said gold standard 222. This allows a customer to identify a number of scenarios that may warrant concern or further action, from policy compliance to patch management and security (among other examples).

The system 100 of FIG. 1 can leverage this framework to enhance data collection efficiency, as it can identify common and uncommon blocks of data across assets. The pattern recognition service 214 may rely on pattern rules 224 stored in one or more databases such as the database(s) 138 of FIG. 1 and the gold standard 222 to identify non-compliant software installations and/or configurations, even when no content exists. Similarly, the pattern recognition service 214 may identify instances when systems are behind in security, software, and operating system updates—also when no content exists.

The pattern recognition service 214 may also identify systems that are infected with malicious software, such as malware or viruses. The pattern recognition service 214 may rely on the gold standard 222 and/or pattern rules 224. The pattern recognition service 214 may also identify gaps in current content coverage. The results of the aforementioned analyses may be forwarded to the human readable results generator 216. The human readable results generator 216 may execute instructions stored on a content platform 226 (or instructions stored in one or more databases such as the database(s) 138 of FIG. 1) to compile results from the pattern recognition service 214 into a human-readable form. This represents a summary of any detected patterns or analysis results regarding the agent-provided data. This summary may be outputted to a user via a user interface such as the user interface 104 of FIG. 1.

The above discussion relates to the analytics pipeline 206 of FIG. 2. In accordance with the analytics pipeline 206 and as discussed above, vulnerabilities, malware, and policy and/or compliance violations can be identified via a comparison of collected data with a gold standard 222. This comparison may identify differences in common data, the presence of data that should not exist, or the lack of data that should exist.

FIG. 2 also illustrates an assessment pipeline 208 for identifying similar instances of data, but without a gold standard. The assessment pipeline 208 may accomplish this by comparing collected data across the entire data set (or at least a portion thereof) of an organization. For example, if a customer has one thousand desktops and all but one contain the same software, the single outlier could have malware or non-compliant software installed thereon.

As another example, the assessment platform 228, which may be similar to the assessment module 124 of FIG. 1, can identify instances in which a group of assets have similar data but outliers in that group have missing data. This missing data may include, but is not limited to, missing vulnerability patches, missing software such as anti-virus software, or the like. The assessment platform 228 can also identify keyed data with different values, which may indicate outdated versions of installed software, misconfigurations of installed software, non-compliant versions, or extra data that may indicate that malware or other unauthorized software is installed.

Accordingly, the embodiments described herein may recognize as significant concepts such as whether or not a patch is installed, the value of a configuration, applications that are installed, applications that are not installed, the state of a policy, or the like. These concepts may all qualify as asset properties, and may also be analyzed in the context of clusters of other, similar assets (e.g., assets in the same group). For example, the embodiments described herein may implement the clustering techniques of Applicant's co-pending U.S. patent application Ser. No. 16/548,068, filed on Aug. 22, 2019, the contents of which are incorporated by reference as if set forth in its entirety herein.

It is noted that not all techniques herein are reliant on a gold standard or baseline. These analyses may rely on thresholding concepts to determine whether differences of data across multiple assets are worth reporting. For example, a keyed property that exists on a small number of assets may suggest a policy violation or the existence of malicious software. If a baseline is in fact available, however, it may be easier to detect these instances even without a threshold analysis. The same is true if a keyed property does not exist on a small number of assets. These assets may have uninstalled software and therefore be in violation of a policy, or they may have an uninstalled patch or have yet to apply a patch in accordance with a policy. In these instances, a baseline may help reduce noise for what is otherwise a complicated problem to solve from just the aforementioned statistical analysis.

Results may be outputted to a reporting module 230 in addition to or in lieu of being outputted to a user. The reporting module 230 may then determine what, if any, remedial or mitigation actions should be taken.

Figure 3:
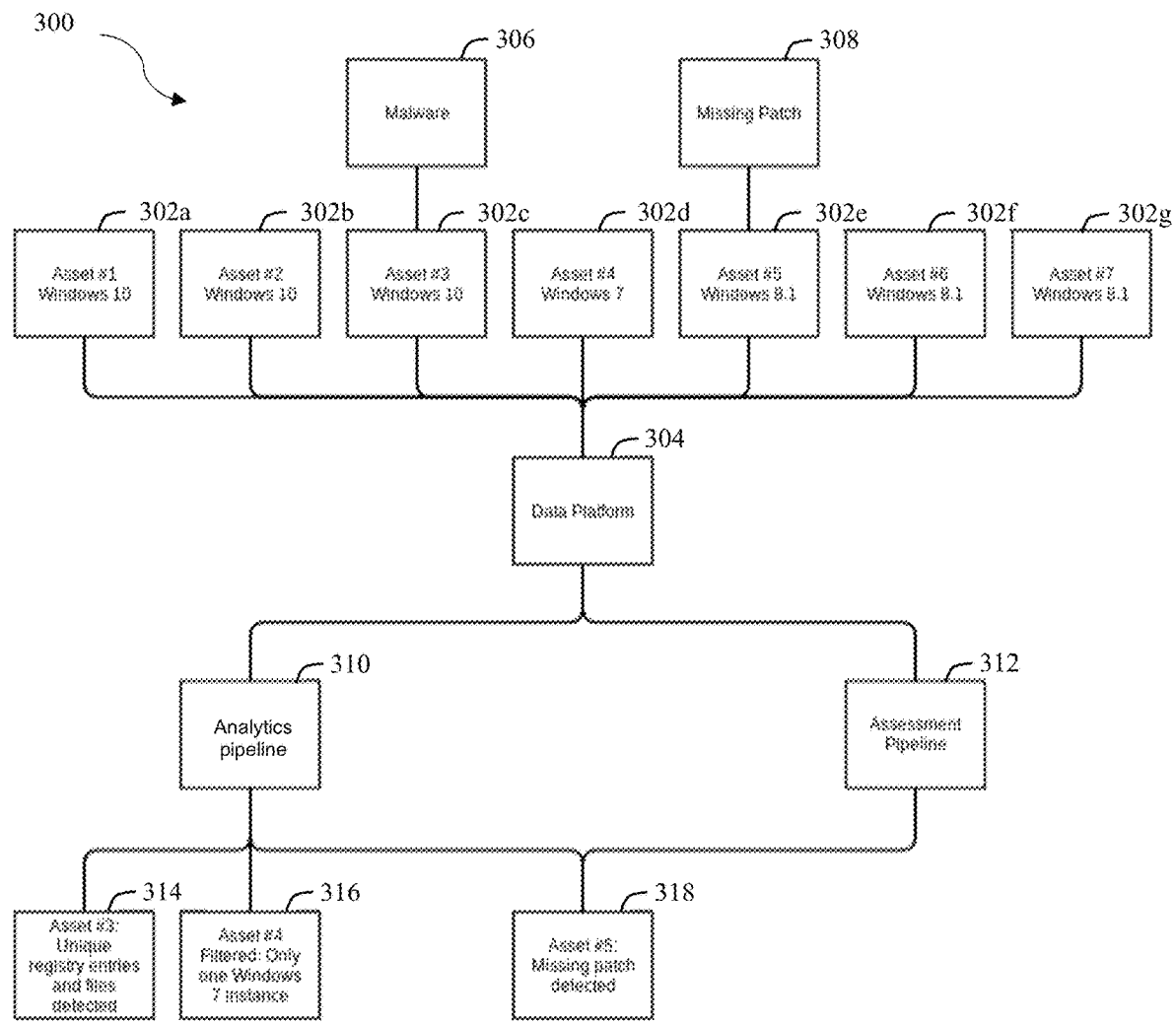
FIG. 3 illustrates a pattern recognition service, according to one embodiment of the present disclosure.

FIG. 3 illustrates an exemplary workflow 300 of a network analysis using the components and techniques discussed above. As seen in FIG. 3, a network may include a plurality of assets 302a—g that each execute some operating system. Data regarding operation of the assets 302a—g may be communicated to the data platform 304, which may be similar to the data platforms 114 and 204 of FIGS. 1 & 2, respectively. As seen in FIG. 3, there are two sets of three systems that use the same operating system, but are not using the same operating system version. That is, assets 302a-c are operating Windows® 10, assets 302e-f are operating Windows® 8.1, and asset 302d is operating Windows® 7 (and is the only asset that operates Windows® 7). As illustrated in FIG. 3, asset 302c is identified as being infected with malware 306, and asset 302e is identified as missing a patch 308 (which may constitute a vulnerability). This may be unknown to operators of assets 302c and 302e.

The data platform 304 may include similar components as those discussed previously, such that it can execute an analytics pipeline 310 and assessment pipeline 312. The analytics pipeline 310 may be similar to the analytics pipeline 206 of FIG. 2, and the assessment pipeline 312 may be similar to the assessment pipeline 208 of FIG. 2. These pipelines 310 and 312 may be executed to evaluate collected data regarding each Windows® system (systems with a different operating system) and perform automated and custom filtering as discussed previously.

As seen in FIG. 3, the pipelines 310 and 312 can identify certain instances of behavior that may suggest vulnerabilities based on the same received raw data. As seen in FIG. 3, the analytics pipeline 310 and the assessment pipeline 312 may work together to produce a more comprehensive result. The assessment pipeline 312 may ask questions regarding the raw data to receive content data that provides more insight regarding vulnerabilities, violations, patching status, update status, and the like, and may also help train the analytics pipeline 310 to help identify vulnerabilities, violations, and the like, in the future.

Identified instance 314 may be that asset 302c includes unique registry entries and files. Instance 316 may be filtered because there are insufficient assets against which to run analytics. Other assets with Windows® 7 or the use of a gold image/baseline would be sufficient to remove the filter, however. Identified instance 318 may be that asset 302e is missing a patch.

The detection of these differences across assets 302a-g could provide information about a customer's environment and without the need for content associated with the information being provided. Accordingly, an entity can learn about these differences and therefore their computing environment without relying on the existing, content-driven techniques.

Referring back to FIG. 1, upon detecting that an asset is anomalous in one or more aspects, the alert module 128 may issue an alert to a user 106 via the user interface 104. This alert may be a visual alert, an audio alert, a text alert, a haptic-based alert, or some combination thereof. This alert may be based on analyses performed by the reporting module 126. For example, in some embodiments, the reporting module 126 may query one or more databases to determine whether detected activity matches known malicious behavior. The user 106 may then investigate the cause of the alert and perform threat mitigation procedures or other actions. Additionally or alternatively, these remedial actions may be implemented autonomously.

In addition to or in lieu of merely reviewing the cause of the alert, the user 106 may provide feedback regarding the asset and the generated alert. For example, the user 106 may review the associated data and decide that the behavior is benign or otherwise not an actual cause for concern. The provided feedback may be used to continually improve the assessment and/or analytics pipelines by, e.g., updating the gold standard and/or the filters.

Example Processes of DCA Pipeline

Figure 4:
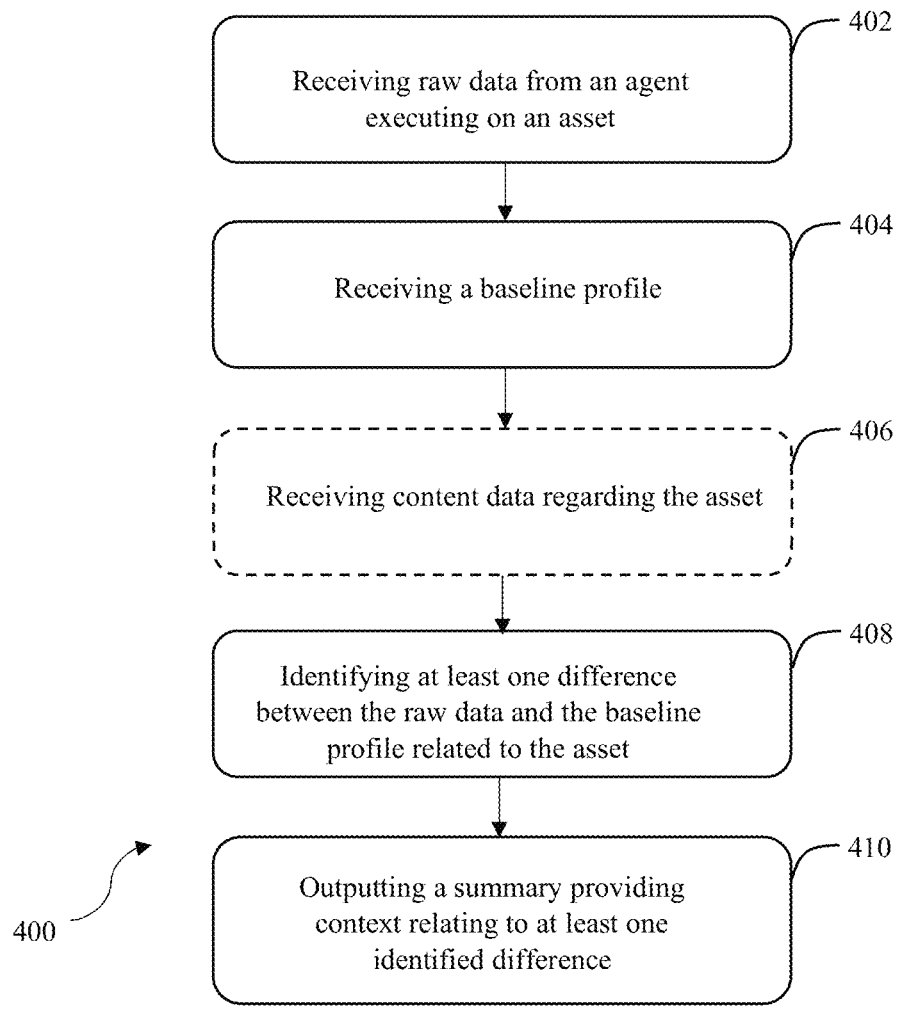
FIG. 4 illustrates a process for determining context related to a difference between assets, according to one embodiment of the present disclosure.

FIG. 4 depicts a flowchart of a method 400 for identifying potential vulnerabilities on an asset in accordance with one embodiment. The system 100 of FIG. 1 or components thereof may perform the steps of method 400. Step 402 involves receiving at an interface raw data from an agent executing on an asset, wherein the raw data relates to operation of the asset. The received data may be gathered by a plurality of agents executing on assets associated with a customer or some other entity. Step 404 involves receiving a baseline profile related to the asset. This baseline profile may essentially be a gold standard (or gold image) that represents how an asset is expected to behave. A customer may nominate an asset to serve as a gold standard, or a gold standard may be generated after monitoring asset behavior.

Step 406 involves receiving content data regarding the asset at the interface. This step is optional, and involves receiving data that is generated from submitting specific questions to a network or assets thereon. This received content data is not necessary but may assist in identifying vulnerabilities. For example, a submitted question to the gathered data may ask whether an asset has a specific patch installed. A returned answer may indicate whether or not the patch is installed. This is only an example and, as discussed previously, returned answers may indicate whether or not a patch is installed, the value of a configuration, applications that are installed, applications that are not installed, the state of a policy, critical or security-related updates made (or not made and even when made), or the like.

Step 408 involves identifying, using a processor executing instructions on a computer readable storage medium, at least one difference between the raw data and the baseline profile related to the asset. A processor such as the processor 108 of FIG. 1 may execute various filters and procedures to analyze the received agent data to determine how it compares to the baseline profile. As discussed previously, this step may involve filtering out certain identified differences to remove expected or otherwise trivial differences.

Step 410 involves outputting, using the processor, a summary providing context relating to at least one identified difference. A results generator such as the human readable results generator 122 of FIG. 1 may transform identified differences into a human readable summary for presentation to a user. The user may then review the differences and implement any appropriate remediation or mitigation measures (e.g., to address a potential vulnerability).

Figure 5:
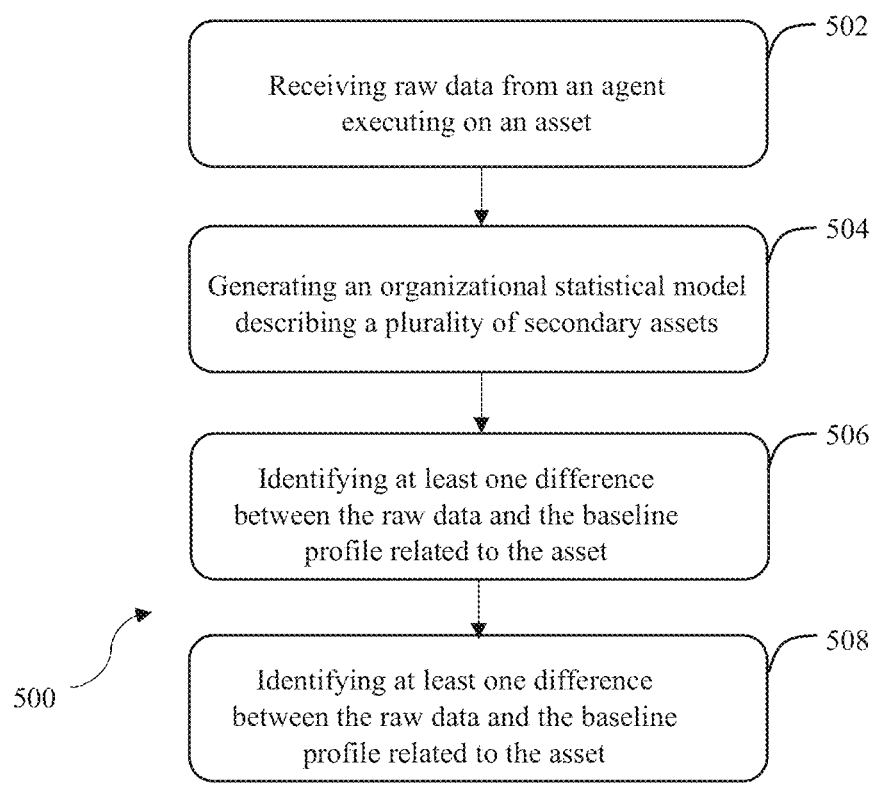
FIG. 5 illustrates a process for implementing an organizational statistic model as part of the DCA Pipeline, according to one embodiment of the present disclosure.

FIG. 5 depicts a flowchart of a method 500 for identifying vulnerabilities on an asset in accordance with another embodiment. The system 100 of FIG. 1 or components thereof may perform the steps of method 500. Step 502 involves receiving at an interface raw data from an agent executing on an asset of a first type, wherein the raw data relates to operation of the asset of the first type. Step 504 involves generating, using a processor executing instructions stored on a computer readable storage medium, an organizational statistical model describing a plurality of secondary assets of the first type. Accordingly, this step gathers and analyzes data regarding how other assets that are similar to the first asset of step 502 are expected to behave.

Step 506 involves executing an analytics engine to identify at least one difference between the raw data from the agent and the organizational statistical model describing the plurality of secondary assets of the first type. This step, and method 500 in general, identifies vulnerabilities on an asset without the use of an explicit gold standard. Rather, method 500 may rely on the behavior of one or more other assets that are similar to the first asset. Similar to step 406 of method 400, this step may involve executing one or more filter mechanisms to remove or otherwise disregard expected or trivial differences between assets.

Step 508 involves outputting, using the processor, a summary relating to at least one identified difference. A results generator such as the human readable results generator 122 may transform identified differences (or other data indicative of vulnerabilities, policy violations, malware, viruses, etc.) into a human readable summary for presentation to a user. The user may then review the differences and implement any appropriate remediation or mitigation measures.

Various embodiments are described with reference to the accompanying drawings, which form a part hereof, and which show specific exemplary embodiments. However, the concepts of the present disclosure may be implemented in many different forms and should not be construed as limited to the embodiments described herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The previous detailed description is, therefore, not to be taken in a limiting sense.

Example Computing and Networking Environment

Reference in the specification to "one embodiment" or to "an embodiment" means that a particular feature, structure, or characteristic described in connection with the embodiments is included in at least one example implementation or technique in accordance with the previous disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the preceding description are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the previous discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the preceding description. In addition, any particular programming language that is sufficient for achieving the techniques and implementations of the present disclosure may be used. A variety of programming languages may be used to implement the present disclosure.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein. The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system. In some examples, a threshold can include a value that is infrequent versus frequent. For example, software that is found on 1 out of 1000 assets is infrequent and has a "low" threshold of existence but exceeds the threshold of an algorithm that declares the threshold a difference of 1000 over 1 (e.g., the inverse of existence or proportional to it's uniqueness). Furthermore, software present on 999 assets but not 1 asset similarly exceeds a similar threshold where the asset that does not contain the software is unique and can be similarly be treated as 1000 over 1 where the denominator in both cases is the outlier. Furthermore, if certain software is new or suspicious, the methods, systems, and processes disclosed herein suggest, automate, alert, or report (e.g., for the purpose of threat mitigation).

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for comprising:
performing, by one or more computer devices that implement a security vulnerability detection system:
receiving at an interface of the security vulnerability detection system, raw data from an agent executing on an asset, wherein the raw data relates to operation of the asset;
receiving a baseline profile related to the asset;
identifying at least one difference between the raw data and the baseline profile related to the asset;
identifying a malicious modification to the asset based on a determination that the at least one difference exceeds a threshold compared to a plurality of secondary assets, wherein the malicious modification is determined using a malware database or malware content on the asset; and
outputting a summary providing context relating to at least one identified difference and the malicious modification.

2. The method of claim 1, further comprising:
receiving content data regarding the asset at the interface, wherein the identification of at least one difference is further based on the received content data.

3. The method of claim 1, further comprising:
filtering the at least one identified difference to remove at least one expected difference or at least one trivial difference to reduce excess noise in the outputted summary.

4. The method of claim 3, wherein
the at least one expected difference relates to a keyed property that is common between the raw data and the baseline profile.

5. The method of claim 4, wherein
the keyed property includes at least one of a user that accessed the asset, an operating system license property, an asset hardware property, an asset network property, and a key value expected to be different at different times.

6. The method of claim 1, further comprising:
identifying a keyed property value for the asset;
receiving a baseline key property value; and
determining a difference between the keyed property value for the asset and the baseline key property value.

7. The method of claim 6, further comprising:
identifying the asset as a cloned virtual machine upon determining that the difference between the keyed property value for the asset and the baseline key property value exceeds a threshold.

8. The method for claim 6, further comprising:
identifying the malicious modification to the asset based on the difference between the keyed property value for the asset and the baseline key property value.

9. The method of claim 1, wherein
identifying the at least one difference between the raw data and the baseline profile includes identifying at least one of a unique registry entry, a unique file entry, and an absence of expected data.

10. The method of claim 1, further comprising:
querying the malware database to determine whether the at least one identified difference matches known malware; and implementing a threat mitigation procedure upon determining the at least one identified difference matches the known malware in the malware database.

11. The method of claim 1, further comprising:
generating, an organizational statistical model describing the plurality of secondary assets, wherein the secondary assets and the asset belong to a same asset type; and
using the organizational statistical model to identify the at least one difference between the raw data and the baseline profile related to the asset.

12. A system comprising:
a security vulnerability detection system implemented by one or more computer devices configured to execute program instructions stored on a computer readable storage medium to:
  receive, via an interface of the security vulnerability detection system, raw data from an agent executing on an asset, wherein the raw data relates to operation of the asset;
  receive, via the interface, a baseline profile related to the asset;
  use a pattern recognition module to identify at least one difference between the raw data and the baseline profile related to the asset;
  identify a malicious modification to the asset based on a determination that the at least one difference exceeds a threshold compared to a plurality of secondary assets, wherein the malicious modification is determined using a malware database or malware content on the asset; and
  use a report generation module to output a summary providing context relating to at least one identified difference and the malicious modification.

13. The system of claim 12, wherein
the interface is further configured to receive content data regarding the asset at the interface, wherein the identification of at least one difference is further based on the received content data.

14. The system of claim 12, wherein
the security vulnerability detection system is configured to filter the at least one identified difference to remove at least one expected difference to reduce excess noise in the outputted summary.

15. The system of claim 14, wherein
the at least one expected difference relates to a keyed property that is common between the raw data and the baseline profile.

16. The system of claim 15, wherein
the keyed property includes at least one of a user that accessed the asset, an operating system license property, an asset hardware property, an asset network property, and a key value expected to be different at different times.

17. The system of claim 12, wherein
the pattern recognition module is further configured to:
  identify a keyed property value for the asset;
  receive a baseline key property value; and
  determine a difference between the keyed property value for the asset and the baseline key property value.

18. The system of claim 17, wherein
the pattern recognition module is further configured to identify the asset as a cloned virtual machine upon determining the difference between the keyed property value for the asset and the baseline key property value exceeds a threshold.

19. The system of claim 17, wherein
the pattern recognition module is further configured to identify the malicious modification to the asset based on the difference between the keyed property value for the asset and the baseline key property value.

20. The system of claim 12, wherein
the pattern recognition module identifies the at least one difference between the raw data and the baseline profile by identifying at least one of a unique registry entry, a unique file entry and an absence of expected data.

* * * * *